United States Patent
Guo

(10) Patent No.: US 10,885,160 B1
(45) Date of Patent: Jan. 5, 2021

(54) USER CLASSIFICATION

(71) Applicant: Advanced New Technologies Co., Ltd., Grand Cayman (KY)

(72) Inventor: Long Guo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/802,226

(22) Filed: Feb. 26, 2020

Related U.S. Application Data

(63) Continuation of application No. PCT/CN2020/072168, filed on Jan. 15, 2020.

(30) Foreign Application Priority Data

Aug. 21, 2019 (CN) .......................... 2019 1 0774647

(51) Int. Cl.
*G06F 21/30* (2013.01)
*H04L 9/32* (2006.01)
(Continued)

(52) U.S. Cl.
CPC ............ *G06F 21/30* (2013.01); *G06F 16/285* (2019.01); *G06N 20/00* (2019.01)

(58) Field of Classification Search
CPC ...... G06F 21/30; G06F 16/285; G06F 21/316; G06F 21/552; G06F 2203/04104;
(Continued)

(56) References Cited

U.S. PATENT DOCUMENTS

2006/0282660 A1* 12/2006 Varghese .............. G07F 7/1041
713/155
2009/0303066 A1* 12/2009 Lee .................... H04M 3/42136
340/679

(Continued)

FOREIGN PATENT DOCUMENTS

| CN | 103530543 | 1/2014 |
| CN | 105678125 | 6/2016 |

(Continued)

OTHER PUBLICATIONS

L. C. Milton and A. Memon, "Intruder detector: A continuous authentication tool to model user behavior," 2016 IEEE Conference on Intelligence and Security Informatics (ISI), Tucson, AZ, 2016, pp. 286-291, doi: 10.1109/ISI.2016.7745492. (Year: 2016).*

(Continued)

*Primary Examiner* — Michael Simitoski
(74) *Attorney, Agent, or Firm* — Fish & Richardson P.C.

(57) ABSTRACT

A computer-implemented user classification method includes: obtaining, by a target terminal device, an initial user classification model from a server, in which the initial user classification model is provided by the server to multiple terminal devices, the multiple terminal devices including the target terminal device; obtaining first operation data of a registered user of the target terminal device; updating the initial user classification model based on the first operation data, to obtain an updated user classification model that is personalized for the registered user; and classifying, based on the updated user classification model, an identity of a current user of the target terminal device.

20 Claims, 5 Drawing Sheets

(51) Int. Cl.
*G06N 20/00* (2019.01)
*G06F 16/28* (2019.01)
*H04W 12/12* (2009.01)

(58) Field of Classification Search
CPC ..... G06F 2221/2139; G06F 2221/2133; G06F 3/0488; G06F 3/017; G06N 20/00; H04L 63/14; H04L 63/1416; H04L 63/1433; H04L 63/1441; H04L 63/20; H04L 63/102; H04L 63/104; H04L 41/16; H04L 67/04; H04L 67/306; H04L 63/08; H04W 12/00; H04W 12/06; H04W 12/00508; H04W 12/0605; H04W 12/12
See application file for complete search history.

(56) References Cited

U.S. PATENT DOCUMENTS

| | | | | |
|---|---|---|---|---|
| 2011/0016534 A1* | 1/2011 | Jakobsson | ............... | H04L 67/22 726/28 |
| 2013/0347100 A1* | 12/2013 | Tsukamoto | ............. | G06F 21/36 726/19 |
| 2014/0300554 A1* | 10/2014 | Samuel | .................. | G06F 3/041 345/173 |
| 2014/0317734 A1* | 10/2014 | Valencia | ............... | G06F 21/316 726/22 |
| 2015/0066822 A1* | 3/2015 | Li | .......................... | G06N 20/00 706/12 |
| 2015/0242760 A1* | 8/2015 | Miao | ...................... | G06N 20/00 706/12 |
| 2015/0356286 A1* | 12/2015 | Quirk | ................... | H04L 9/3231 726/19 |
| 2015/0371023 A1* | 12/2015 | Chen | ..................... | G06F 21/316 706/12 |
| 2016/0231830 A1* | 8/2016 | Nemala | ............... | G06F 3/04842 |
| 2017/0103194 A1* | 4/2017 | Wechsler | .............. | G06F 21/316 |
| 2017/0169715 A1* | 6/2017 | Alyuz Civitci | ........ | G06N 20/00 |
| 2017/0220786 A1* | 8/2017 | Guo | ........................ | G06F 21/36 |
| 2017/0227995 A1* | 8/2017 | Lee | ..................... | H04L 63/0892 |
| 2018/0189466 A1* | 7/2018 | Raviv | .................. | G06N 3/0454 |
| 2019/0236249 A1* | 8/2019 | Pavlou | ............. | G06F 16/24578 |
| 2020/0053093 A1* | 2/2020 | Goodsitt | ............. | H04L 63/1408 |

FOREIGN PATENT DOCUMENTS

| | | |
|---|---|---|
| CN | 106296406 | 1/2017 |
| CN | 106911668 | 6/2017 |
| CN | 107886243 | 4/2018 |
| CN | 108616491 | 10/2018 |
| CN | 109509021 | 3/2019 |
| CN | 109614777 | 4/2019 |
| CN | 110516418 | 11/2019 |
| WO | WO2018117704 | 6/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/072168, dated May 27, 2020, 20 pages (with machine translation).

* cited by examiner

USER CLASSIFICATION

CROSS-REFERENCE TO RELATED APPLICATIONS

This application is a continuation of PCT Application No. PCT/CN2020/072168, filed on Jan. 15, 2020, which claims priority to Chinese Patent Application No. 201910774647.2, filed on Aug. 21, 2019, and each application is hereby incorporated by reference in its entirety.

The present application relates to the field of computer data processing technologies, and in particular, to user classification methods, apparatuses, and devices.

BACKGROUND

With development of Internet of Things (IoT) technologies, functions of IoT terminals become richer. For example, a user can use a terminal device to perform activities such as transaction, communication, and entertainment, so that the terminal device is closely related to information such as privacy and property of the user.

SUMMARY

In view of the previous description, implementations of the present application provide user classification methods, apparatuses, and devices, to alleviate the problem that each user needs to be provided with a personalized user classification method for a terminal device.

To alleviate the previous technical problem, the implementations of the present application are implemented as follows:

An implementation of the present specification provides a user classification method, where the method is applied to a target terminal device and includes: obtaining an initial user classification model from a server, where the initial user classification model is provided by the server to multiple terminal devices including the target terminal device; obtaining operation data of a registered user of the target terminal device, to obtain a first operation data set; updating the initial user classification model based on the first operation data set, to obtain an updated user classification model; and classifying an identity of a user of the target terminal device by using the updated user classification model.

An implementation of the present specification provides a method for establishing an initial user classification model, where the method is applied to a server and includes: obtaining a training sample set, where training samples in the training sample set include operation data of respective users of sample terminal devices, and a quantity of sample terminal devices corresponding to all the training samples in the training sample set is greater than a reference value; performing feature extraction on the training sample set to obtain a training sample feature set; establishing an initial user classification model based on the training sample feature set; and sending the initial user classification model to a target terminal device, so that the target terminal device performs user classification by using the initial user classification model.

An implementation of the present specification provides a user classification apparatus, where the apparatus is applied to a target terminal device and includes: a first acquisition module, configured to obtain an initial user classification model from a server, where the initial user classification model is provided by the server to multiple terminal devices including the target terminal device; a second acquisition module, configured to obtain operation data of a registered user of the target terminal device, to obtain a first operation data set; an updating module, configured to update the initial user classification model based on the first operation data set, to obtain an updated user classification model; and a classification module, configured to classify an identity of a user of the target terminal device by using the updated user classification model.

An implementation of the present specification provides an apparatus for establishing an initial user classification model, where the apparatus is applied to a server and includes: an acquisition module, configured to obtain a training sample set, where training samples in the training sample set include operation data of respective users of sample terminal devices, and a quantity of sample terminal devices corresponding to all the training samples in the training sample set is greater than a reference value; a feature extraction module, configured to perform feature extraction on the training sample set to obtain a training sample feature set; a model establishment module, configured to establish an initial user classification model based on the training sample feature set; and a sending module, configured to send the initial user classification model to a target terminal device, so that the target terminal device performs user classification by using the initial user classification model.

An implementation of the present specification provides a user classification device, including: at least one processor; and a memory communicatively connected to the at least one processor, where the memory stores an instruction that can be executed by the at least one processor, and the instruction is executed by the at least one processor to enable the at least one processor to: obtain an initial user classification model from a server, where the initial user classification model is provided by the server to multiple terminal devices including the user classification device; obtain operation data of a registered user of the user classification device, to obtain a first operation data set; update the initial user classification model based on the first operation data set, to obtain an updated user classification model; and classify an identity of a user of the user classification device by using the updated user classification model.

An implementation of the present specification provides a device for establishing an initial user classification model, including: at least one processor; and a memory communicatively connected to the at least one processor, where the memory stores an instruction that can be executed by the at least one processor, and the instruction is executed by the at least one processor to enable the at least one processor to: obtain a training sample set, where training samples in the training sample set include operation data of respective users of sample terminal devices, and a quantity of sample terminal devices corresponding to all the training samples in the training sample set is greater than a reference value; perform feature extraction on the training sample set to obtain a training sample feature set; establish an initial user classification model based on the training sample feature set; and send the initial user classification model to a target terminal device, so that the target terminal device performs user classification by using the initial user classification model.

An implementation of the present specification provides a computer readable medium, where the computer readable medium stores a computer readable instruction, and the computer readable instruction can be executed by a processor to implement the previously described user classification method or the previously described method for establishing an initial user classification model.

The at least one technical solution used in the implementations of the present specification can achieve the following beneficial effects:

The target terminal device updates the initial user classification model obtained from the server by using the operation data of the registered user of the target terminal device, and classifies the identity of the user of the target terminal device by using the updated user classification model. Because the updated user classification model learns a use habit of the registered user of the target terminal device, a classification result generated by the updated user classification model is highly effective and accurate, thereby providing a user with a personalized user classification method for a terminal device.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute improper limitations on the present application. In the accompanying drawings.

DESCRIPTION OF IMPLEMENTATIONS

Figure 1:
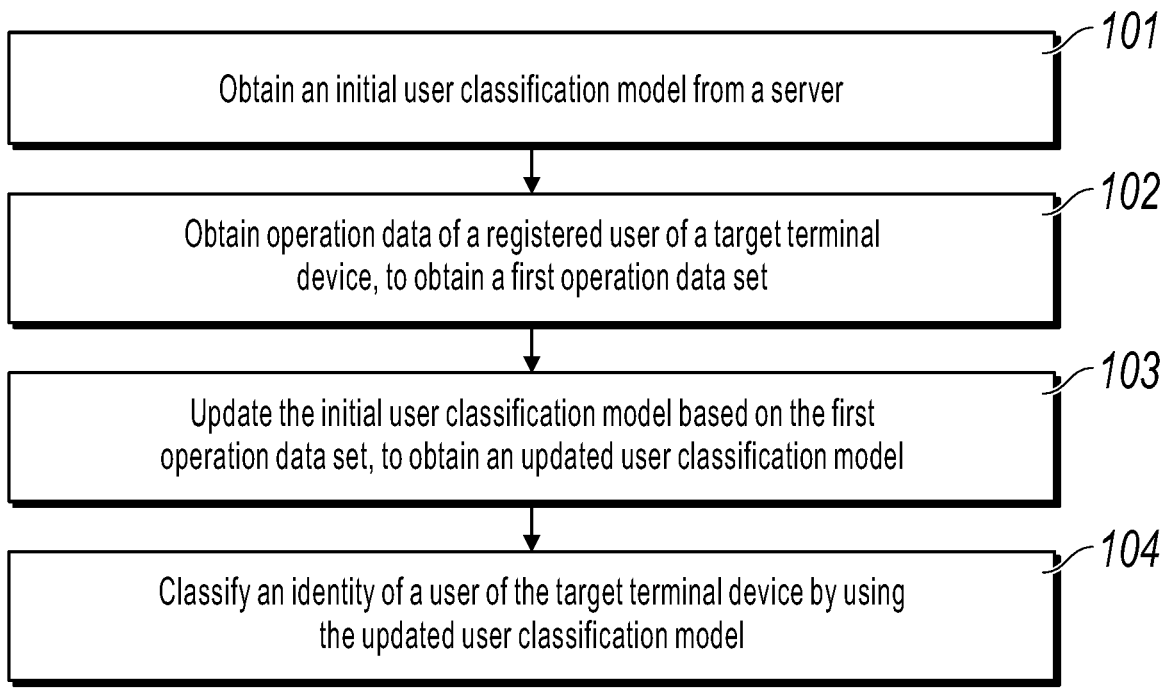
FIG. 1 is a schematic flowchart illustrating a user classification method, according to an implementation of the present specification.

To make the objectives, technical solutions, and advantages of the present application clearer, the following clearly and comprehensively describes the technical solutions of the present application with reference to specific implementations and corresponding accompanying drawings of the present application. Clearly, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Before the present invention is described, concepts related to the present invention are first briefly described.

The Internet of Things (IoT) is a network that allows all common physical objects that can be independently addressed to achieve interconnection based on an information carrier such as the Internet or a conventional telecommunications network. An IoT terminal is a device that connects a sensing network layer and a transmission network layer in the IoT to collect data and send data to a network layer. Any device, such as a mobile phone or a computer, used by a user can be used as an IoT terminal. At present, the IoT, which is the largest "net" in history, is quietly changing people's lifestyles. People prefer to obtain services, such as news browsing, online shopping, and transfer, from application programs installed on IoT terminal devices, such as a mobile phone and a computer. Because services provided by some application programs are closely associated with property of a user, if a terminal device of the user is lost, an application account in a logged-in state on the terminal device may be embezzled by an illegal person. It brings a large security risk to the property of the user, and also brings an opportunity for development of a user classification technology for a terminal device.

The inventor finds, through research, that there are two main user classification methods for a terminal device at present. One method is adding a user identity verification step, and responding to a user service request after the user identity verification succeeds. For example, when a user uses an application program on a terminal device for payment, a fee needs to be deducted from an application account of the user after face recognition verification on the user succeeds. In this user classification method, the user needs to cooperate in the operation and steps are cumbersome, which affects user experience. The other method is using a user classification model to analyze operation data generated when a user uses a terminal device, to classify the identity of the user operating the terminal device. Because the user classification model needs to be established by training an algorithm model by using a large amount of training data, a service provider usually establishes a common user classification model and provides the common user classification model to each user for use. In addition, in consideration of security, a user is usually not allowed to modify parameters of a user classification model in a terminal device of the user. Therefore, terminal devices of different users use the same user classification model, and it is difficult to provide different user classification models to different users. In practice, different users have different terminal device use habits. Therefore, this conventional user classification model cannot be applied to all users, and consequently the user classification model has relatively poor use effect.

Therefore, a user classification method with good applicability and effectiveness for a terminal device of each user is urgently needed.

FIG. 1 shows a user classification method, according to an implementation of the present specification. The method is applied to a target terminal device. From a perspective of program, the method can be executed by a program installed on a terminal device (namely, the target terminal device) of a user. In practice, an IoT edge device can obtain a large amount of data generated by an IoT terminal device (that is, a terminal device of a user) and perform edge computing, to generate a faster network service response. Therefore, in practice, the method can be alternatively executed by a program in an edge device corresponding to the terminal device of the user. The edge device can be implemented by using a physical device or a virtual device. For example, when the edge device is a virtual device, the edge device can be deployed in the terminal device of the user in a form of a container by using a Docker technology.

As shown in FIG. 1, the method can include the following steps.

Step 101: Obtain an initial user classification model from a server, where the initial user classification model is provided by the server to multiple terminal devices including the target terminal device.

In one or more implementations of the present specification, because the initial user classification model needs to be established by training an algorithm model by using a large amount of training data, but user operation data on a terminal device of a single user usually cannot satisfy a need of generating the initial user classification model. Therefore, the initial user classification model can be established in the server, and the established initial user classification model can be provided to a terminal device of each user for use, that is, different terminal devices obtain the same initial user classification model from the server.

In one or more implementations of the present specification, the server can be a server of a specified application program installed on the target terminal device, or can be a server of an operating system of the target terminal device. The initial user classification model is a model established by the server based on a training sample set by using an algorithm used to process sequential data, and the initial user classification model can be used to classify an identity of a user performing an operation on a terminal device.

The training sample set includes positive samples and negative samples. The positive sample can be operation data that records an operation performed by a user on a terminal device that logs in to a personal registered account of the user. The negative sample can be operation data that records an operation performed by a user on a terminal device that logs in to a registered account of another user. Any positive sample or negative sample usually includes multiple pieces of operation data. Because operation data usually correlates with each other to a certain degree, operation data in any positive sample or negative sample can be sorted in an ascending order of occurrences of corresponding operations.

In one or more implementations of the present specification, because both the positive samples and the negative samples are sequential data, the initial user classification model is established by using the algorithm used to process sequential data, to improve applicability and accuracy of the established initial user classification model. The algorithm used to process sequential data includes but is not limited to a recurrent neural network, a long short-term memory network, a gated recurrent unit, or a convolutional neural network.

Step 102: Obtain operation data of a registered user of the target terminal device, to obtain a first operation data set.

In one or more implementations of the present specification, the target terminal device logs in to a registered account of the registered user. Each piece of operation data in the first operation data set is generated when the target terminal device logs in to the same registered account of the registered user. The registered account of the registered user can be a registered account of the registered user in the operating system of the target terminal device, or can be a registered account of the registered user in the specified application program installed on the target terminal device. The target terminal device can include but is not limited to a mobile phone, a computer, and a wearable device.

Specifically, the operation data in the first operation data set is data generated to record various operations performed by the registered user on the target terminal device and the specified application program installed on the target terminal device, and the operation data in the first operation data set can be used to describe when, where, and how the registered user performs an operation on the target terminal device and the specified application program installed on the target terminal device, and a type of the operation. The operation data in the first operation data set can include at least one of login data, function setting data, communication data, browsing data, transaction data, and identity verification data.

A piece of operation data in the first operation data set can specifically include information such as an identifier of the target terminal device, location information of the target terminal device, an identifier of the registered account of the registered user, an identifier of an operation triggered by the registered user, and an occurrence time of the operation. For example, a piece of operation data in the first operation data set can be {computer model aaa, identifier bbb of a registered account in a payment application program, call fee charging, 100 RMB, 2019-06-01-14:30}, and the operation data means that a registered user performs an operation of charging a call fee of 100 RMB by using personal registered account bbb in the payment application program in a logged-in state on a computer of model aaa at 14:30 on Jun. 1, 2019. Alternatively, a piece of operation data in the first operation data set can be {mobile phone model aaa, b city c district, identifier ddd of a registered account in an operating system, fingerprint unlocking, 2019-06-01-18:00}, and the operation data means that a registered user performs fingerprint unlocking on a mobile phone of model aaa that logs in to personal registered account ddd in the operating system in city c district b at 18:00 on Jun. 1, 2019.

In practice, the first operation data set can be extracted from log information generated in a running process of the target terminal device. The log information can include running log information of the operating system of the target terminal device, or can include running log information of the specified application program installed on the target terminal device. The log information generated in the running process of the target terminal device can specifically include login request data, remote invocation request data, transaction data, sensor data, function parameter modification data, etc.

Step 103: Update the initial user classification model based on the first operation data set, to obtain an updated user classification model.

In one or more implementations of the present specification, each piece of operation data in the first operation data set is data that records an operation performed by the registered user on the target terminal device. Therefore, the initial user classification model can be trained by using the operation data in the first operation data set as input and using a label representing the registered user as output, to obtain the updated user classification model.

The operation data in the first operation data set is generated based on operations performed by the registered user on the target terminal device, and the operations performed by the registered user usually correlate with each other to a certain degree. For example, the registered user can perform a trigger operation on each function supported by the specified application program only after performing a login operation on the specified application program, or the registered user can perform a corresponding payment cancellation operation only after performing a payment operation. Therefore, the operation data in the first operation data set can be sorted in an ascending order of occurrences of the operations corresponding to the operation data, and the initial user classification model is trained in the sorting order to obtain the updated user classification model.

Step 104: Classify an identity of a user of the target terminal device by using the updated user classification model.

In one or more implementations of the present specification, operation data generated by the target terminal device in response to an operation performed by a current user can be used as input of the updated user classification model, and output of the updated user classification model can be used as a user classification result. The user classification result can indicate that the current user and the registered user are the same user, or can indicate that the current user and the registered user are different users, thereby implementing classification the identity of the user of the target terminal device.

In one or more implementations of the present specification, because the updated user classification model learns operation habits of the registered user of the target terminal device and the specified application program installed on the target terminal device, a classification result obtained by using the updated user classification model to classify the identity of the user of the target terminal device is highly accurate and effective.

Based on the method in FIG. 1, an implementation of the present specification further provides some specific implementations of the method, which are described below.

In one or more implementations of the present specification, step 104 of classifying an identity of a user of the target terminal device by using the updated user classification model can specifically include: obtaining current operation data, where the current operation data is data that records an operation performed by a current user on the target terminal device; analyzing the current operation data by using the updated user classification model, to obtain a risk value; and when the risk value is greater than a predetermined threshold, determining that the current user and the registered user are different users, that is, the target terminal device is embezzled; or when the risk value is less than or equal to the predetermined threshold, determining that the current user and the registered user are the same user, that is, the target terminal device is not embezzled.

In one or more implementations of the present specification, the current operation data can include data that records operations performed by the current user on the target terminal device in a time period between which and a current moment a time difference is less than a predetermined value. For example, when the predetermined value is 5 minutes, operation data generated in the last 5 minutes can be used as the current operation data. A format of the current operation data and a type of information included in the current operation data can be the same as a format of the operation data in the first operation data set and a type of information included in the operation data in the first operation data set. Details are omitted here for simplicity.

In one or more implementations of the present specification, operation data generated at the current moment and a neighboring moment (that is, a moment between which and the current moment a time difference is less than the predetermined value) is used as the current operation data, so that a more accurate classification result of the user of the target terminal device can be obtained based on the current operation data.

In one or more implementations of the present specification, the user classification model can be a binary classification model or a multi-classification model. When the user classification model is a binary classification model, the risk value can be a probability value indicating that the current user of the target terminal device is not the registered user. The risk value is compared with the predetermined threshold to obtain the classification result of the identity of the user of the target terminal device. The predetermined threshold can be set based on an actual demand.

When the user classification model is a multi-classification model, the risk value can be a probability value indicating that a current operation should not occur. The risk value is compared with the predetermined threshold to obtain the classification result of the identity of the user of the target terminal device. For example, assume that the predetermined threshold is 60%, the current operation is a payment operation, and the user classification model has three output values: a probability value 20% indicating that the current operation is a payment operation, a probability value 60% indicating that the current operation is a browsing operation, and a probability value 20% indicating that the current operation is a communication operation. In this case, the risk value is a sum (namely, 80%) of the probability value indicating that the current operation is a browsing operation and the probability value indicating that the current operation is a communication operation. Because the risk value is greater than the predetermined threshold (namely, 60%), it can be determined that the user of the target terminal device is not the registered user.

When it is determined, by using the method in FIG. 1, that the user of the target terminal device is not the registered user, a further security prevention measure needs to be taken to ensure property security of the registered account that the registered user logs in to in the target terminal device. Based on the method in FIG. 1, after it is determined that the current user and the registered user of the target terminal device are different users, the method can further include: performing identity verification on the current user; and if the identity verification succeeds, responding to the operation corresponding to the current operation data.

In one or more implementations of the present specification, after it is determined that the user of the target terminal device is not the registered user, that is, when it is determined that the current user that performs the current operation on the target terminal device and the user of the registered account that the target terminal device logs in to are different users, a response to the current operation can be suspended, and risk alarm information used to indicate that the current operation has an embezzlement risk can be displayed on a display screen of the target terminal device. Identity verification is performed on the current user based on a predetermined policy; and if the identity verification succeeds, the current operation is responded to; or if the identity verification fails, the response to the current operation is rejected. Performing identity verification on the current user based on the predetermined policy can specifically include: performing live face detection, fingerprint verification, service password verification of a registered account in a specified application program, etc. on the current user.

In one or more implementations of the present specification, after it is determined that the current user that performs the operation on the target terminal device is not the registered user, identity verification is performed on the current user, and after the identity verification succeeds, the current operation performed by the current user on the target terminal device is responded to. Therefore, damage caused to property security of the registered user when an embezzler uses the target terminal device and an application account of a specified application that the target terminal device logs in to can be alleviated, and error correction can be performed on impact caused by an erroneous determining result when it is erroneously determined that the user of the target terminal device is not the registered user, thereby improving use security and practicality of the user operation classification method for a terminal device.

After the target terminal device of the registered user is lost or embezzled, the registered user can alarm the target terminal device or the specified application program installed on the target terminal device, to facilitate security prevention for the target terminal device. Based on the method in FIG. 1, an implementation of responding to user alarm information is provided in this implementation of the present specification. In this implementation, the method in FIG. 1 can further include: obtaining alarm information, where the alarm information is used to indicate that the target terminal device is lost or embezzled; and stopping updating a user classification model in the target terminal device after obtaining the alarm information.

In one or more implementations of the present specification, the alarm information can be alarm information sent by the registered user to the target terminal device by using another terminal device, or can be alarm information sent by the server of the specified application program to the target terminal device after the registered user alarms the server of the specified application program.

Specifically, the user can use another terminal device to send alarm information that satisfies a specified format to the target terminal device by using a short message, a multimedia message, or a communication form supported by the specified application program. For example, the registered user sends alarm information "a mobile phone loss alarm, a model of the target terminal device, the identifier of the registered account of the registered user that the target terminal device logs in to, and an identity card number of the registered user" in a form of a short message to the target terminal device. After receiving the alarm information, the target terminal device can automatically classify and verify effectiveness of the alarm information. If the alarm information is effective, updating a user classification model in the target terminal device is stopped, to prevent the user classification model in the target terminal device from learning operation data of an embezzler as operation data of the registered user.

Alternatively, the registered user can use another terminal device to alarm the server of the specified application program for loss or embezzlement of the target terminal device in a communication form such as a short message, a multimedia message, or a voice call. For example, the registered user can make a voice call with a working person at the server of the specified application program, to provide information such as "a mobile phone loss alarm, a model of the target terminal device, and the registered account of the registered user in the specified application program that the target terminal device logs in to", and after verification performed by the server of the specified application program on the alarm information of the registered user succeeds, the server of the specified application program sends alarm information to the specified application program on the target terminal device, to stop updating a user classification model in the target terminal device, thereby ensuring effectiveness of the operation recognition model in the target terminal device.

In practice, after an unregistered user embezzles the target terminal device, the target terminal device generates operation data that records an operation performed by the embezzler on the target terminal device. If the user classification model in the target terminal device is updated by using the operation data, accuracy of the user classification model is affected. To alleviate the previous case, based on the method in FIG. 1, an implementation of updating the initial user classification model is provided in this implementation of the present specification.

For step 103 in FIG. 1, the updating the initial user classification model based on the first operation data set can specifically include: performing feature extraction on the first operation data set to obtain a first operation data feature set, where the operation data in the first operation data set is data that records operations performed by the registered user on the target terminal device before predetermined duration; and updating the initial user classification model based on the first operation data feature set. The initial user classification model is a model established by using the algorithm used to process sequential data; and operation data features in the first operation data feature set are sorted in an ascending order of occurrences of operations corresponding to the operation data features.

In one or more implementations of the present specification, each of the occurrence times of the operations corresponding to the operation data in the first operation data set is earlier than a predetermined update moment at which the initial user classification model is updated, and a time difference between each of the occurrence times of the operations corresponding to the operation data in the first operation data set and the predetermined update moment is not less than the predetermined duration. The predetermined duration can be limited based on an actual demand. For example, when the predetermined duration is 24 hours, it means that each of the occurrence times of the operations corresponding to the operation data in the first operation data set is at least 24 hours earlier than the predetermined update moment.

In one or more implementations of the present specification, the initial user classification model is updated by using the operation data that records the operations performed by the registered user on the target terminal device before the predetermined duration, so that alarm time of the predetermined duration for an event that the terminal device is lost or embezzled can be reserved for the user, to prevent the initial user classification model from learning an operation of an embezzler as an operation of the registered user, thereby ensuring effectiveness of the user classification model.

In practice, because an input variable of the initial user classification model usually needs to be represented as a feature parameter form, feature extraction is performed on the first operation data set. Specifically, one-hot-encoding can be performed on character data in the first operation data set to obtain a character data feature set, and standardization processing or normalization processing can be performed on metric data in the first operation data set to obtain a metric data feature set. The character data feature set and the metric data feature set are combined and features are sorted in an ascending order of occurrences of operations corresponding to the features, to obtain the first operation feature data set.

The character data means a data type that does not have a computing capability. The character type data can include a Chinese character, a letter, a number, a symbol, and a combination thereof, for example, "apple" and "operation time: 2019-05-01-16:30". The metric data means an observed value measured by digital scale, and a measurement result is expressed as a specific value, for example, "120.00" in consumption amount "120.00" RMB.

A method of one-hot encoding is encoding N states by using an N-bit status register, where each state has its own independent register bits, and only one of the bits is effective at any time. The character data can be converted into quantizable feature vectors through one-hot encoding, thereby facilitating training of the user classification model.

The metric data can be directly used as features. However, for a multi-dimensional feature, if a value range of the multi-dimensional feature is extremely large, impact of another feature on a result is likely to be ignored. In this case, the metric data needs to be processed. There are the following several common metric data processing methods:

Standardization processing: adjusting distribution of the metric data to standard normal distribution.

Normalization processing: enabling processed metric data to be distributed in a range with a given minimum value and maximum value, for example, the metric data is mapped to range [0, 1].

The standardization processing or the normalization processing is performed on the metric data, to alleviate adverse impact caused when values of data of some dimensions are far greater than values of data of other dimensions.

In practice, the user classification model usually cannot be optimal by updating the initial user classification model only once. Therefore, the user classification model needs to be updated multiple times. Based on the method in FIG. 1, assume that the operation data in the first operation data set used when the initial user classification model is updated is data that records operations performed by the registered user on the target terminal device in a first time period. After the initial user classification model is updated, the user classification model in the target terminal device can be further updated in the following form: obtaining a second operation data set when a predetermined update condition is satisfied, where operation data in the second operation data set is data that records operations performed by the registered user on the target terminal device in a second time period, and the second time period and the first time period are different time periods; and updating the updated user classification model based on the second operation data set.

In one or more implementations of the present specification, "when a predetermined update condition is satisfied" can mean "when a predetermined update moment is reached" and/or "when a data amount of added operation data reaches a predetermined value". The added operation data is data used to record operations performed by the registered user on the target terminal device after an end moment of the first time period.

In practice, the alarm time of the predetermined duration for loss or embezzlement of the target terminal device needs to be reserved for the registered user, to prevent the user classification model from learning an operation of an embezzler as an operation of the registered user. Therefore, an end moment of the second time period should be predetermined duration earlier than an updated moment of the updated user classification model.

In practice, the user classification model in the target terminal device can be updated for multiple times by using this implementation, to persistently optimize the user classification model in the target terminal device, thereby improving risk prediction accuracy of the user classification model in the target terminal device.

Figure 2:
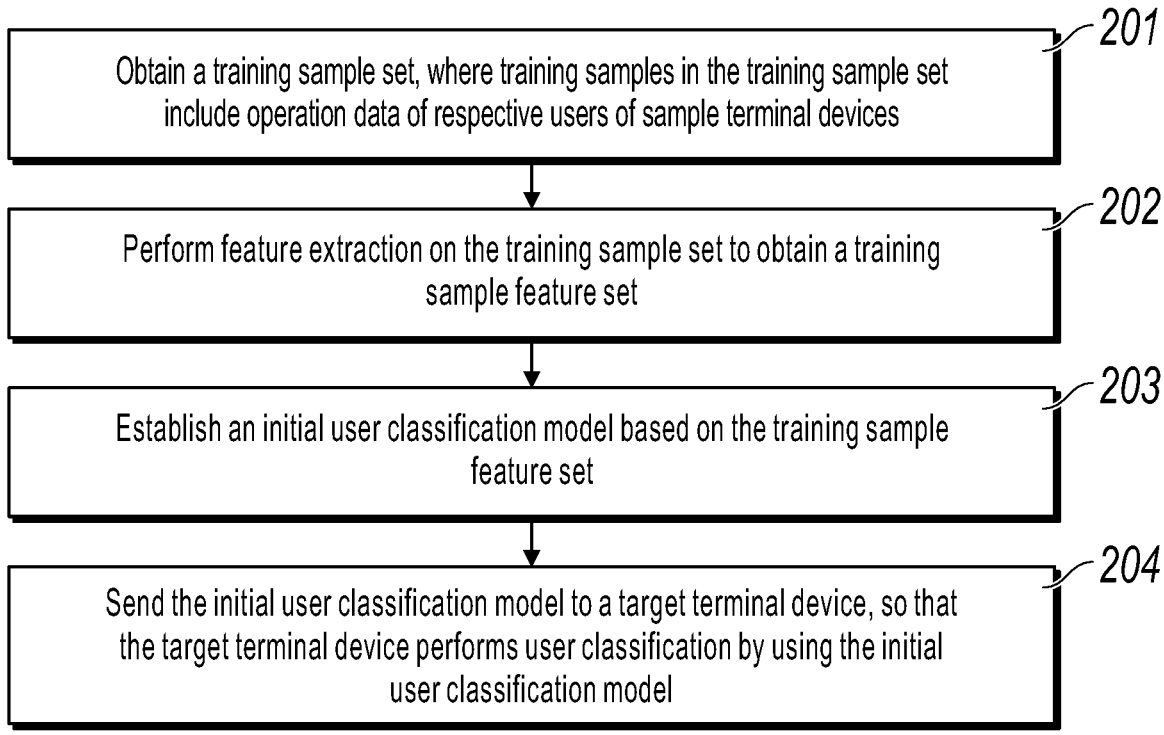
FIG. 2 is a schematic flowchart illustrating a method for establishing an initial user classification model, according to an implementation of the present specification.

FIG. 2 shows a method for establishing an initial user classification model, according to an implementation of the present specification. From a perspective of program, the method can be executed by a server.

As shown in FIG. 2, the process can include the following steps.

Step 201: Obtain a training sample set, where training samples in the training sample set include operation data of respective users of sample terminal devices, and a quantity of sample terminal devices corresponding to all the training samples in the training sample set is greater than a reference value.

In one or more implementations of the present specification, the initial user classification model needs to be established by training an algorithm model by using a large quantity of training samples, causing large system resource consumption. Therefore, the server usually can be used to collect operation data from multiple sample terminal devices, and generate training samples based on the collected operation data. Specifically, a minimum value, namely, the reference value, of the quantity of sample terminal devices corresponding to all the training samples in the training sample set can be set based on an actual demand. For example, when the reference value is 1000, the server needs to collect operation data from at least 1000 terminal devices, to obtain the training sample set. Setting a relatively large reference value can improve training sample coverage, and ensure quality and amount of training data.

Step 202: Perform feature extraction on the training sample set to obtain a training sample feature set.

Step 203: Establish an initial user classification model based on the training sample feature set.

Step 204: Send the initial user classification model to a target terminal device, so that the target terminal device performs user classification by using the initial user classification model.

In one or more implementations of the present specification, the target terminal device is a terminal device that is to perform user classification. The server generates the initial user classification model based on the large quantity of training samples, and delivers the initial user classification model to multiple target terminal devices, so that the target terminal devices can continue to update the user classification model by using operation data generated by the target terminal devices, thereby facilitating generation of a personalized and highly effective user classification model.

Based on the method in FIG. 2, an implementation of the present specification further provides some specific implementations of the method, which are described below.

The training samples for training the algorithm model usually need to include positive samples and negative samples. On this basis, a specific implementation of obtaining the training sample set is provided in this implementation of the present specification. Step 201 of obtaining a training sample set can specifically include: obtaining a positive sample set, where positive samples in the positive sample set are operation data used to record operations performed by registered users on sample terminal devices, and one positive sample corresponds to one sample terminal device and one registered user; obtaining a negative sample set, where the negative sample set includes unregistered user samples, the unregistered user samples are operation data used to record operations performed by unregistered users on sample terminal devices, and one unregistered user sample corresponds to one sample terminal device; and generating the training sample set based on the positive sample set and the negative sample set.

In one or more implementations of the present specification, each piece of operation data collected from a sample terminal device is generated when the sample terminal device logs in to a registered account. The registered account can be a registered account of a registered user in an operating system of the sample terminal device, or can be a registered account of a registered user in a specified application program installed on the sample terminal device.

In practice, after a registered user gives an embezzlement alarm for a certain sample terminal device, or when the server identifies that a certain sample terminal device is embezzled, that is, when a user performs an operation on a terminal device that logs in to a registered account of another user, it can be considered that the sample terminal device is embezzled, and an embezzlement identifier can be allocated to the sample terminal device. Operation data collected from a sample terminal device that has an embezzlement identifier is used as a negative sample.

For a sample terminal device that has no embezzlement identifier, it can be considered that the sample terminal device is not embezzled, and operation data collected from the sample terminal device is data that records operations performed by a registered user on the sample terminal device that logs in to a personal registered account. Therefore, all or a part of continuous operation data generated by a sample terminal device that has no embezzlement identifier when the sample terminal device logs in to a certain registered account can be used as a positive sample.

In practice, negative samples may be insufficient due to a relatively small quantity of sample terminal devices that have embezzlement identifiers. On this basis, the present specification provides an implementation of generating a spliced user sample as a negative sample.

In this implementation, the negative sample set further includes spliced user samples, and one spliced user sample includes operation data of at least two users.

Specifically, the spliced user sample can be generated based on different training samples of at least two corresponding users. In this implementation, for example, the spliced user sample is generated by using two training samples. Assume that operation data in a first training sample and operation data in a second training sample are operation data of different users, and the first training sample or the second training sample can be a positive sample or a negative sample. A part of the operation data in the first training sample can be used as lower-ranked data in a spliced user sample, and a part of the operation data in the second training sample can be used as higher-ranked data in the spliced user sample, to generate the spliced user sample. Alternatively, a part of the operation data in the first training sample and a part of the operation data in the second training sample can be sorted in an ascending order of occurrences of operations corresponding to the operation data, and a sorted operation data sequence can be used as a spliced user sample.

In this implementation, because the spliced user sample includes operation data of different users, the spliced user sample can be used as a negative sample, to alleviate the problem that negative samples are insufficient.

In one or more implementations of the present specification, the initial user classification model is a model established by using an algorithm used to process sequential data; and for any training sample feature in the training sample feature set, operation data sub features in the any training sample feature are sorted in an ascending order of occurrences of operations corresponding to the operation data sub features, and one training sample feature corresponds to one training sample.

In one or more implementations of the present specification, because operations corresponding to operation data in each training sample correlate with each other to a certain degree, the initial user classification model is established by using the algorithm used to process sequential data, to establish a more accurate initial user classification model.

Figure 3:
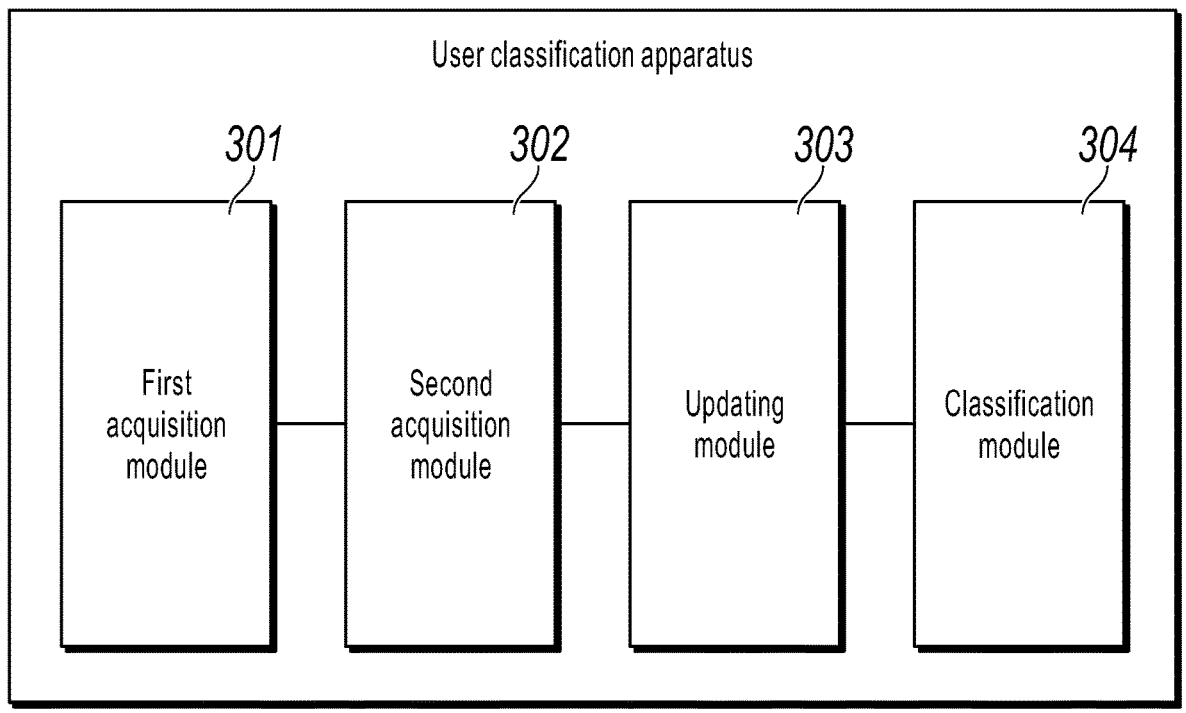
FIG. 3 is a schematic structural diagram illustrating a user classification apparatus corresponding to the method in FIG. 1, according to an implementation of the present specification.

Based on the same idea, an implementation of the present specification further provides an apparatus corresponding to the method in FIG. 1. FIG. 3 is a schematic structural diagram illustrating a user classification apparatus corresponding to the method in FIG. 1, according to an implementation of the present specification. As shown in FIG. 3, the apparatus can include: first acquisition module 301, configured to obtain an initial user classification model from a server, where the initial user classification model is provided by the server to multiple terminal devices including the target terminal device; second acquisition module 302, configured to obtain operation data of a registered user of the target terminal device, to obtain a first operation data set; updating module 303, configured to update the initial user classification model based on the first operation data set, to obtain an updated user classification model; and classification module 304, configured to classify an identity of the user of the target terminal device by using the updated user classification model.

The initial user classification model is a model established by using an algorithm used to process sequential data; and operation data features in the first operation data feature set are sorted in an ascending order of occurrences of operations corresponding to the operation data features. The operation data in the first operation data set includes at least one of login data, function setting data, communication data, browsing data, and transaction data.

In one or more implementations of the present specification, the user classification apparatus can further include: a third acquisition module, configured to obtain alarm information, where the alarm information is used to indicate that the target terminal device is lost or embezzled; and an updating stopping module, configured to stop updating a user classification model in the target terminal device after the alarm information is obtained.

In one or more implementations of the present specification, updating module 303 can specifically include: a feature extraction unit, configured to perform feature extraction on the first operation data set to obtain a first operation data feature set, where the operation data in the first operation data set is data that records operations performed by the registered user on the target terminal device before predetermined duration; and an updating unit, configured to update the initial user classification model based on the first operation data feature set.

In one or more implementations of the present specification, classification module 304 can be specifically configured to: obtain current operation data, where the current operation data is data that records an operation performed by a current user on the target terminal device; analyze the current operation data by using the updated user classification model, to obtain a risk value; and when the risk value is greater than a predetermined threshold, determine that the current user and the registered user are different users.

In one or more implementations of the present specification, the user classification apparatus can further include: an identity verification module, configured to perform identity verification on the current user; and an operation response module, configured to: if the identity verification succeeds, respond to the operation corresponding to the current operation data.

In one or more implementations of the present specification, the user classification apparatus can further include: a fourth acquisition module, configured to obtain a second operation data set, where operation data in the first operation data set is data that records operations performed by the registered user on the target terminal device in a first time period, operation data in the second operation data set is data that records operations performed by the registered user on the target terminal device in a second time period, and the second time period and the first time period are different time periods; and the user classification apparatus can further include: a further updating module, configured to: after the initial user classification model is updated, update the updated user classification model based on the second operation data set.

Figure 4:
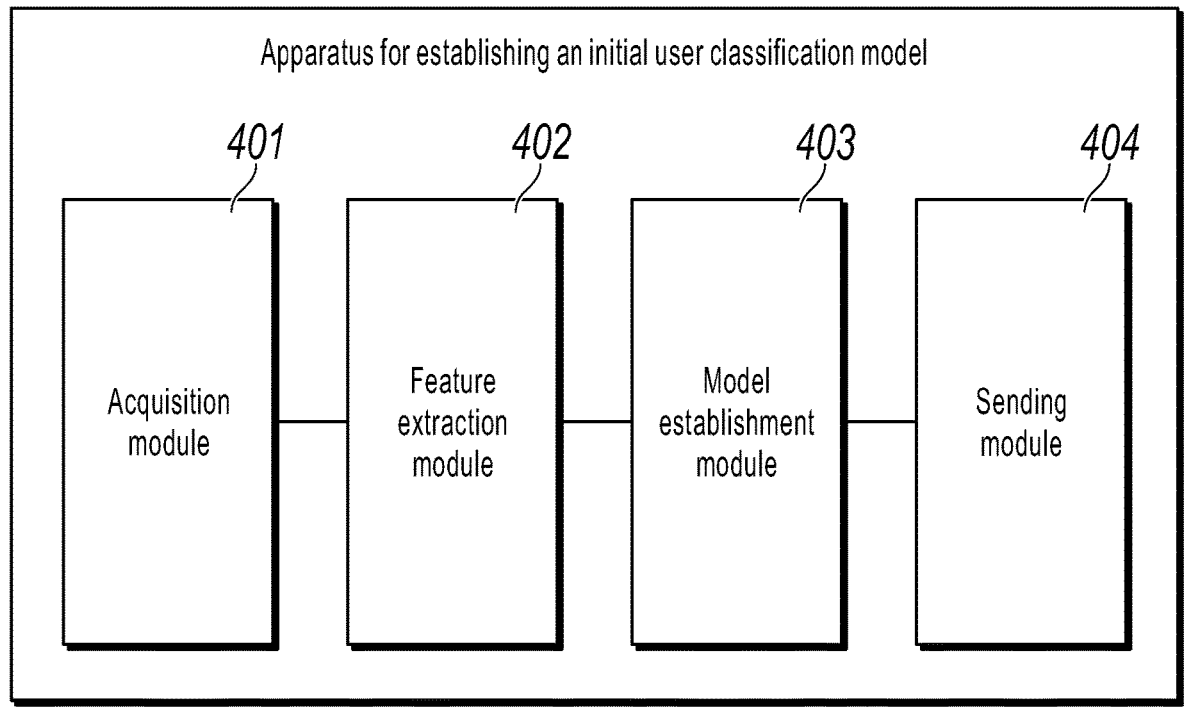
FIG. 4 is a schematic structural diagram illustrating an apparatus for establishing an initial user classification model corresponding to the method in FIG. 2, according to an implementation of the present specification.

Based on the same idea, an implementation of the present specification further provides an apparatus corresponding to the method in FIG. 2. FIG. 4 is a schematic structural diagram illustrating an apparatus for establishing an initial user classification model corresponding to the method in FIG. 2, according to an implementation of the present specification. As shown in FIG. 4, the apparatus can include: acquisition module 401, configured to obtain a training sample set, where training samples in the training sample set include operation data of respective users of sample terminal devices, and a quantity of sample terminal devices corresponding to all the training samples in the training sample set is greater than a reference value; feature extraction module 402, configured to perform feature extraction on the training sample set to obtain a training sample feature set; model establishment module 403, configured to establish an initial user classification model based on the training sample feature set; and sending module 404, configured to send the initial user classification model to a target terminal device, so that the target terminal device performs user classification by using the initial user classification model.

In one or more implementations of the present specification, acquisition module 401 can specifically include: a first acquisition unit, configured to obtain a positive sample set, where positive samples in the positive sample set are operation data used to record operations performed by registered users on sample terminal devices, and one positive sample corresponds to one sample terminal device and one registered user; a second acquisition unit, configured to obtain a negative sample set, where the negative sample set includes at least one of unregistered user samples and spliced user samples, the unregistered user samples are operation data used to record operations performed by unregistered users on sample terminal devices, one unregistered user sample corresponds to one sample terminal device, and one spliced user sample includes operation data of at least two users; and a training sample set generation unit, configured to generate the training sample set based on the positive sample set and the negative sample set.

The initial user classification model is a model established by using an algorithm used to process sequential data; and for any training sample feature in the training sample feature set, operation data sub features in the any training sample feature are sorted in an ascending order of occurrences of operations corresponding to the operation data sub features, and one training sample feature corresponds to one training sample.

Figure 5:
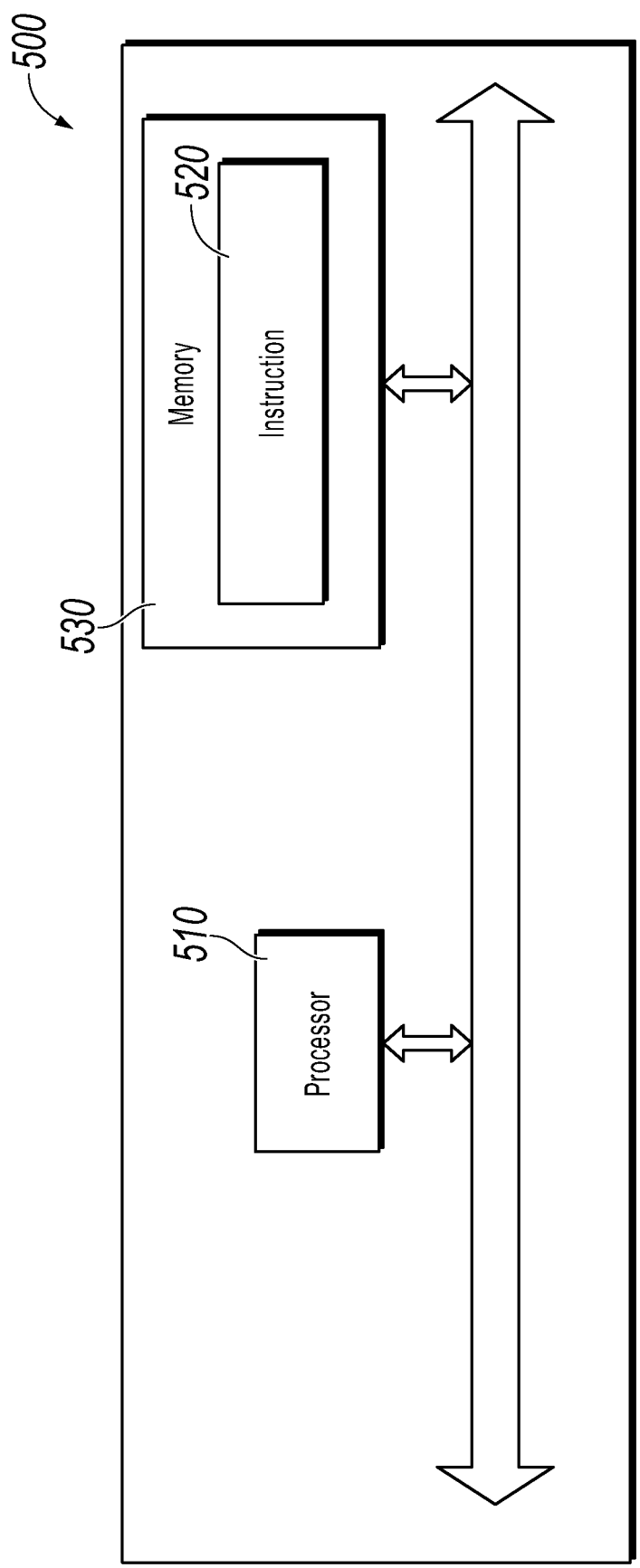
FIG. 5 is a schematic structural diagram illustrating a user classification device, according to an implementation of the present specification.

Based on the same idea, an implementation of the present specification further provides a device corresponding to the method in FIG. 1. FIG. 5 is a schematic structural diagram illustrating a user classification device, according to an implementation of the present specification. As shown in FIG. 5, device 500 can include: at least one processor 510; and memory 530 communicatively connected to the at least one processor, where the memory stores instruction 520 that can be executed by at least one processor 510, and the instruction is executed by at least one processor 510 to enable at least one processor 510 to: obtain an initial user classification model from a server, where the initial user classification model is provided by the server to multiple terminal devices including the user classification device; obtain operation data of a registered user of the user classification device, to obtain a first operation data set; update the initial user classification model based on the first operation data set, to obtain an updated user classification model; and classify an identity of the user of the user classification device by using the updated user classification model.

Figure 6:
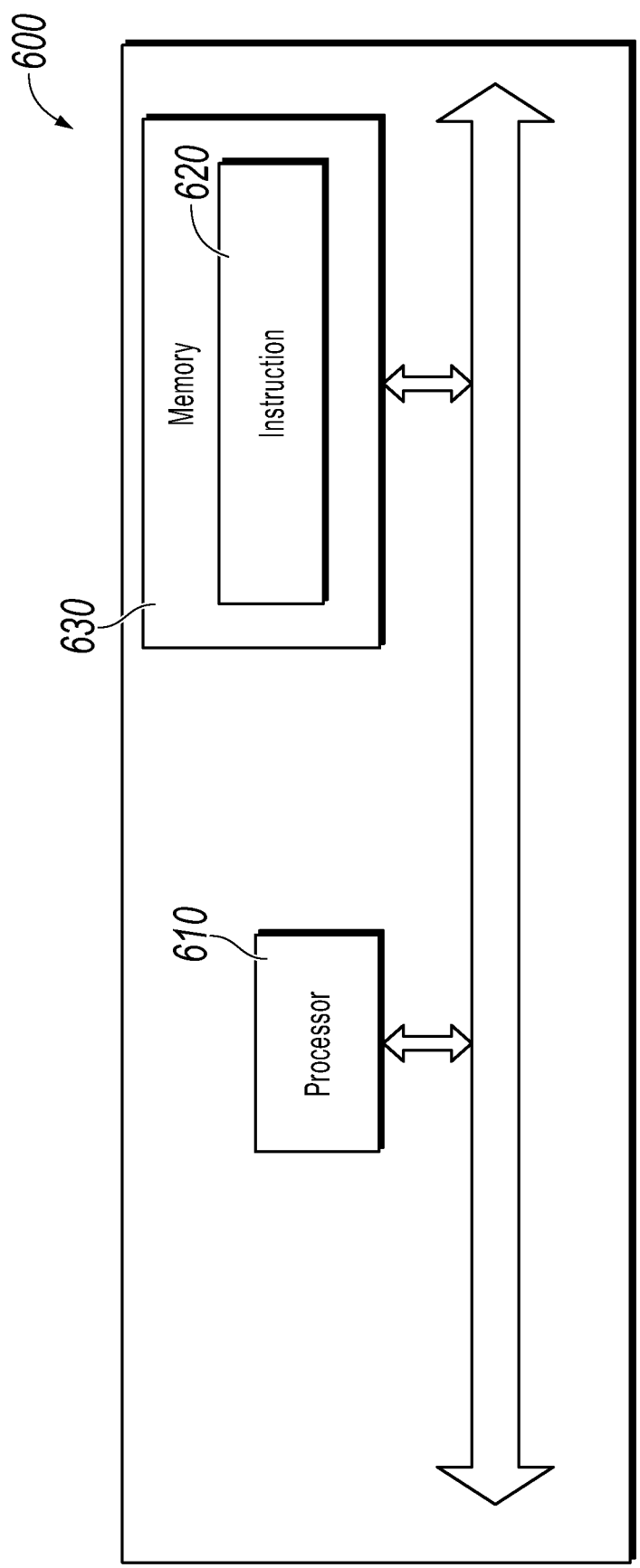
FIG. 6 is a schematic structural diagram illustrating a device for establishing an initial user classification model, according to an implementation of the present specification.

Based on the same idea, an implementation of the present specification further provides a device corresponding to the method in FIG. 2. FIG. 6 is a schematic structural diagram illustrating a device for establishing an initial user classification model, according to an implementation of the present specification. As shown in FIG. 6, device 600 can include: at least one processor 610; and memory 630 communicatively connected to the at least one processor, where the memory stores instruction 620 that can be executed by at least one processor 610, and the instruction is executed by at least one processor 610 to enable at least one processor 610 to: obtain a training sample set, where training samples in the training sample set include operation data of respective users of sample terminal devices, and a quantity of sample terminal devices corresponding to all the training samples in the training sample set is greater than a reference value; perform feature extraction on the training sample set to obtain a training sample feature set; establish an initial user classification model based on the training sample feature set; and send the initial user classification model to a target terminal device, so that the target terminal device performs user classification by using the initial user classification model.

Based on the same idea, an implementation of the present specification further provides a computer readable medium, where the computer readable medium stores a computer readable instruction, and the computer readable instruction can be executed by a processor to implement the previously described user classification method or the previously described method for establishing an initial user classification model.

In the 1990s, whether a technical improvement is a hardware improvement (for example, an improvement to circuit structures, such as a diode, a transistor, or a switch) or a software improvement (an improvement to a method process) can be clearly distinguished. However, as technologies develop, current improvements to many method processes can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a single PLD, without requiring a chip manufacturer to design and manufacture a dedicated integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used at present. A person skilled in the art should also understand that a hardware circuit that implements a logical method process can be readily obtained provided that the method process is logically programmed by using several of the previous hardware description languages and is programmed into an integrated circuit.

A controller can be implemented by using any appropriate method. For example, the controller can be in a form of a microprocessor or a processor, a computer readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can be alternatively implemented as a part of control logic of the memory. A person skilled in the art also knows that, in addition to implementing the controller by using only the computer readable program code, method steps can be logically programmed to allow the controller to implement the same function in a form of a logic gate, a switch, an ASIC, a programmable logic controller, or a built-in microcontroller. Therefore, the controller can be considered as a hardware component, and an apparatus that is included in the controller and configured to implement various functions can also be considered as a structure in the hardware component. Alternatively, the apparatus configured to implement various functions can even be considered as both a software module implementing the method and a structure in the hardware component.

The system, apparatus, module, or unit illustrated in the previous implementations can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the previous apparatus is described, the previous apparatus is divided into various units based on functions for separate description. Certainly, when the present application is implemented, functions of the units can be implemented in one or more pieces of software and/or hardware.

A person skilled in the art should understand that an implementation of the present invention can be provided as a method, a system, or a computer program product. Therefore, the present invention can use a form of hardware only implementations, software only implementations, or implementations with a combination of software and hardware. Moreover, the present disclosure can use a form of a computer program product that is implemented on one or more computer-usable storage media (including but not limited to a magnetic disk memory, a CD-ROM, an optical memory, etc.) that include computer-usable program code.

The present invention is described with reference to the flowcharts and/or block diagrams of the method, the device (system), and the computer program product according to the implementations of the present invention. It should be understood that computer program instructions can be used to implement each process and/or each block in the flowcharts and/or the block diagrams and a combination of a process and/or a block in the flowcharts and/or the block diagrams. These computer program instructions can be provided to a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

Alternatively, these computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

Alternatively, these computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Specific implementations of the present specification are described above. Other implementations fall within the scope of the appended claims. In some cases, the actions or steps recorded in the claims can be performed in an order different from the order in the implementations and the desired results can still be achieved. In addition, the process depicted in the accompanying drawings does not necessarily require the shown particular order to achieve the desired results. In some implementations, multi-tasking and parallel processing can be or may be advantageous.

In a typical configuration, a computing device includes one or more central processing units (CPUs), input/output interfaces, network interfaces, and memories.

The memory may include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD) or another optical storage, a cassette, a cassette magnetic disk storage, or another magnetic storage device, or any other non-transmission medium. The computer storage medium can be configured to store information that can be accessed by a computing device. As defined in the present specification, the computer readable medium does not include computer readable transitory media such as a modulated data signal and a carrier.

It is worthwhile to further note that, the terms "include" and "comprise" or their any other variants are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can be alternatively practiced in distributed computing environments. In the distributed computing environments, tasks are performed by remote processing devices connected through a communications network. In a distributed computing environment, the program module can be located in both local and remote computer storage media including storage devices.

The implementations in the present specification are described progressively. For same or similar parts in the implementations, mutual references can be made to the implementations mutually. Each implementation focuses on a difference from other implementations. Particularly, a system implementation is basically similar to a method implementation, and therefore is described briefly. For related parts, references can be made to some descriptions in the method implementation.

The previous descriptions are merely implementations of the present application, and are not intended to limit the present application. A person skilled in the art can make various modifications and changes to the present application. Any modification, equivalent replacement, improvement, etc. made without departing from the spirit and principle of the present application shall fall within the scope of the claims in the present application.

What is claimed is:

1. A computer-implemented user classification method, comprising:
   obtaining, by a target terminal device, an initial user classification model from a server, wherein the initial user classification model is provided by the server to multiple terminal devices, the multiple terminal devices comprising the target terminal device;
   obtaining first operation data of a registered user of the target terminal device during a first time period, the first operation data recording one or more operations performed by the registered user on the target terminal device;
   delaying updating the initial user classification model for a predetermined amount of time after an occurrence time of the one or more operations during the first time period in order to prevent the initial user classification model from learning based on an operation of a user other than the registered user;
   the predetermined amount of time after the occurrence time of the one or more operations, updating the initial user classification model based on the first operation data, to obtain an updated user classification model that is personalized for the registered user; and
   classifying, based on the updated user classification model, an identity of a current user of the target terminal device.

2. The computer-implemented method of claim 1, wherein classifying the identity of the current user comprises:
   obtaining current operation data, wherein the current operation data records one or more operations performed by the current user on the target terminal device;
   analyzing, based on the updated user classification model, the current operation data, to obtain a risk value;
   determining that the risk value is greater than a predetermined threshold; and
   based on determining that the risk value is greater than the predetermined threshold, determining that the current user and the registered user are different users.

3. The computer-implemented method of claim 2, further comprising, subsequent to determining that the current user and the registered user are different users:
   performing identity verification on the current user;
   determining that the identity verification has succeeded; and
   based on determining that the identity verification has succeeded, responding to an additional operation performed by the current user.

4. The computer-implemented method of claim 1, wherein the first operation data records one or more operations performed by the registered user on the target terminal device in the first time period; and
   wherein, subsequent to updating the initial user classification model, the computer-implemented method further comprises:
   obtaining second operation data, wherein the second operation data records one or more additional operations performed by the registered user on the target terminal device in a second time period, wherein the second time period and the first time period are different time periods; and
   updating the updated user classification model based on the second operation data.

5. The computer-implemented method of claim 1, further comprising:
   obtaining alarm information, wherein the alarm information indicates that the target terminal device is lost or embezzled; and
   based on the alarm information, stopping the updating of the initial user classification model.

6. The computer-implemented method of claim 1, wherein updating the initial user classification model comprises:
   performing feature extraction on the first operation data to obtain a first operation data feature set, wherein the first operation data feature set comprises a character data feature set and a numerical data feature set.

7. The computer-implemented method of claim 1, wherein the first operation data comprises at least one of login data, function setting data, communication data, browsing data, and transaction data.

8. A non-transitory, computer-readable medium storing one or more instructions executable by a computer system to perform operations comprising:

obtaining, by a target terminal device, an initial user classification model from a server, wherein the initial user classification model is provided by the server to multiple terminal devices, the multiple terminal devices comprising the target terminal device;

obtaining first operation data of a registered user of the target terminal device during a first time period, the first operation data recording one or more operations performed by the registered user on the target terminal device;

delaying updating the initial user classification model for a predetermined amount of time after an occurrence time of the one or more operations during the first time period in order to prevent the initial user classification model from learning based on an operation of a user other than the registered user;

the predetermined amount of time after the occurrence time of the one or more operations, updating the initial user classification model based on the first operation data, to obtain an updated user classification model that is personalized for the registered user; and classifying, based on the updated user classification model, an identity of a current user of the target terminal device.

9. The computer-readable medium of claim 8, wherein classifying the identity of the current user comprises:
obtaining current operation data, wherein the current operation data records one or more operations performed by the current user on the target terminal device;
analyzing, based on the updated user classification model, the current operation data, to obtain a risk value;
determining that the risk value is greater than a predetermined threshold; and
based on determining that the risk value is greater than the predetermined threshold, determining that the current user and the registered user are different users.

10. The computer-readable medium of claim 9, wherein the operations further comprise, subsequent to determining that the current user and the registered user are different users:
performing identity verification on the current user;
determining that the identity verification has succeeded; and
based on determining that the identity verification has succeeded, responding to an additional operation performed by the current user.

11. The computer-readable medium of claim 8, wherein the first operation data records one or more operations performed by the registered user on the target terminal device in the first time period; and
wherein, subsequent to updating the initial user classification model, the operations further comprise:
obtaining second operation data, wherein the second operation data records one or more additional operations performed by the registered user on the target terminal device in a second time period, wherein the second time period and the first time period are different time periods; and
updating the updated user classification model based on the second operation data.

12. The computer-readable medium of claim 8, further comprising:
obtaining alarm information, wherein the alarm information indicates that the target terminal device is lost or embezzled; and
based on the alarm information, stopping the updating of the initial user classification model.

13. The computer-readable medium of claim 8, wherein updating the initial user classification model comprises:
performing feature extraction on the first operation data to obtain a first operation data feature set, wherein the first operation data feature set comprises a character data feature set and a numerical data feature set.

14. The computer-readable medium of claim 8, wherein the first operation data comprises at least one of login data, function setting data, communication data, browsing data, and transaction data.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a target terminal device, an initial user classification model from a server, wherein the initial user classification model is provided by the server to multiple terminal devices, the multiple terminal devices comprising the target terminal device;
obtaining first operation data of a registered user of the target terminal device during a first time period, the first operation data recording one or more operations performed by the registered user on the target terminal device;
delaying updating the initial user classification model for a predetermined amount of time after an occurrence time of the one or more operations during the first time period in order to prevent the initial user classification model from learning based on an operation of a user other than the registered user;
the predetermined amount of time after the occurrence time of the one or more operations, updating the initial user classification model based on the first operation data, to obtain an updated user classification model that is personalized for the registered user; and
classifying, based on the updated user classification model, an identity of a current user of the target terminal device.

16. The computer-implemented system of claim 15, wherein classifying the identity of the current user comprises:
obtaining current operation data, wherein the current operation data records one or more operations performed by the current user on the target terminal device;
analyzing, based on the updated user classification model, the current operation data, to obtain a risk value;
determining that the risk value is greater than the predetermined threshold; and
based on determining that the risk value is greater than the predetermined threshold, determining that the current user and the registered user are different users.

17. The computer-implemented system of claim 16, wherein the operations further comprise, subsequent to determining that the current user and the registered user are different users:
performing identity verification on the current user;
determining that the identity verification has succeeded; and based on determining that the identity verification has succeeded, responding to an additional operation performed by the current user.

18. The computer-implemented system of claim 15, wherein the first operation data records one or more operations performed by the registered user on the target terminal device in the first time period; and
   wherein, subsequent to updating the initial user classification model, the operations further comprise:
      obtaining second operation data, wherein the second operation data records one or more additional operations performed by the registered user on the target terminal device in a second time period, wherein the second time period and the first time period are different time periods; and
      updating the updated user classification model based on the second operation data.

19. The computer-implemented system of claim 15, further comprising:
   obtaining alarm information, wherein the alarm information indicates that the target terminal device is lost or embezzled; and
   based on the alarm information, stopping the updating of the initial user classification model.

20. The computer-implemented system of claim 15, wherein updating the initial user classification model comprises:
   performing feature extraction on the first operation data to obtain a first operation data feature set, wherein the first operation data feature set comprises a character data feature set and a numerical data feature set.

* * * * *